Nov. 19, 1957

M. T. SCHUMB 2,813,435

REDUCTION GEAR TRANSMISSION

Filed Oct. 21, 1954

Inventor
Martin T. Schumb
by Roberts Cushman & Grant
Attys

Nov. 19, 1957  M. T. SCHUMB  2,813,435
REDUCTION GEAR TRANSMISSION
Filed Oct. 21, 1954  3 Sheets-Sheet 2
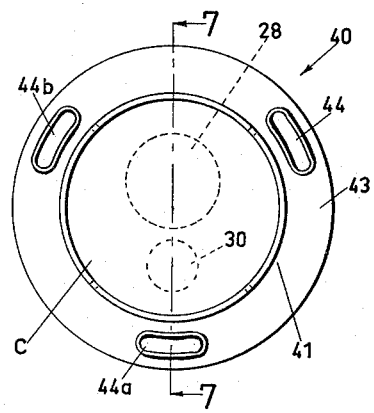
Fig. 6
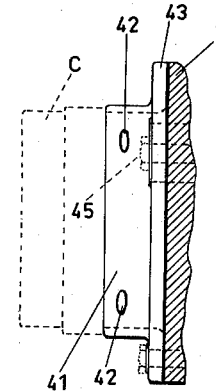
Fig. 7
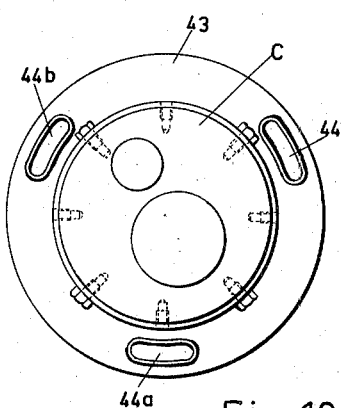
Fig. 10
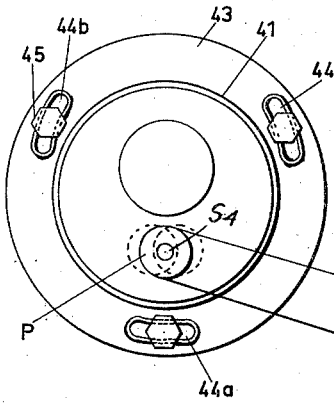
Fig. 8
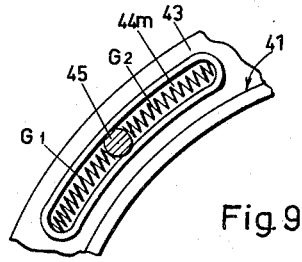
Fig. 9
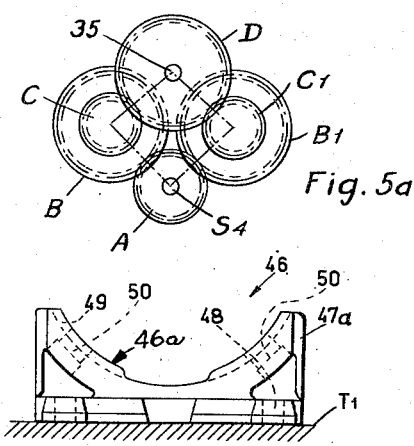
Fig. 5a
Fig. 13
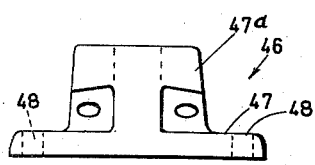
Fig. 12
Inventor
Martin T. Schumb
by Roberts Cushman Grover
Atty's Nov. 19, 1957 M. T. SCHUMB 2,813,435
REDUCTION GEAR TRANSMISSION
Filed Oct. 21, 1954 3 Sheets-Sheet 3

Inventor
Martin T. Schumb
by Roberts Cushman Crown
Attys

United States Patent Office 2,813,435
Patented Nov. 19, 1957

2,813,435

REDUCTION GEAR TRANSMISSION

Martin T. Schumb, Milton, Mass., assignor to Boston Gear Works, Div. The Murray Company of Texas, Inc., North Quincy, Mass., a corporation of Delaware Application October 21, 1954, Serial No. 463,736

11 Claims. (Cl. 74—421)

This invention pertains to a reduction gear transmission of the self-contained type wherein the shafts and gears which transmit motion from an intake shaft to an output shaft (whose axes are parallel) are housed within a casing so as to constitute a self-contained unit, and relates more especially to such a transmission unit having a casing so designed as to make readily possible the support or mounting of the unit in almost any desired position without necessitating any change in its interior arrangement. Among the objects of the invention are to provide a transmission unit of the above type which may, if desired, be suspended upon the output shaft, that is to say, the shaft of a mechanism which is to be driven, or which alternatively may be mounted in a stationary base so designed that the input and output shafts are parallel to the surface against which the base rests, or to be mounted in a base of another type such that the axes of the input and output shafts are perpendicular to the surface of the support to which the base is attached, and further, to provide a casing so designed that it may readily be rotatably adjusted relatively to such a base so that the plane which contains the axes of the input and output shafts may be inclined at any desired angle. Other and further objects and advantages of the invention will be pointed out in the following more detailed description and by reference to the accompanying drawings wherein:

Fig. 5a is a diagram illustrating a desirable arrangement of shafts, gears and pinions in accordance with the present invention;

Fig. 6 is a plan view of one form of base with which the casing of Fig. 1 may be associated;

Fig. 7 is an edge elevation of the base shown in Fig. 6, showing the casing, in dotted lines, mounted in the base and showing the base supported against a vertical surface;

Fig. 8 is a view generally similar to Fig. 6 showing the base of the latter figure with the casing mounted therein, and diagrammatically indicating means for driving the input shaft;

Fig. 9 is a fragmentary view to larger scale than Fig. 8, illustrating an arrangement whereby the drive belt of Fig. 8 may be automatically tensioned;

Fig. 10 is a view similar to Fig. 8, omitting the drive connections and showing the plane of the axes of the input and output shafts inclined at a selected one of a large number of different positions to which it may be adjusted;

Fig. 12 is a diagrammatic end view showing the base of Fig. 11 but omitting the casing;

Fig. 13 is a side elevation of the base shown in Fig. 11;

Figure 1:
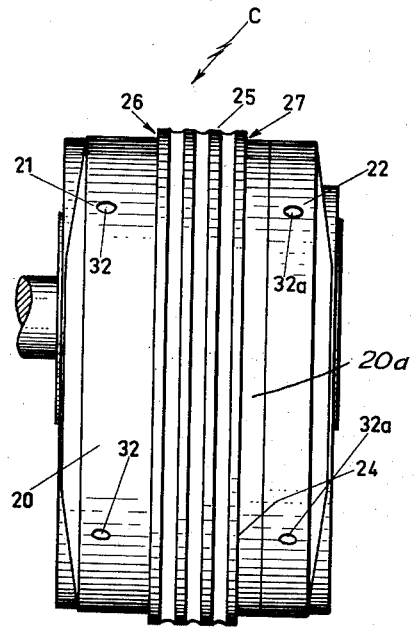
Fig. 1 is a side elevation of one desirable form of casing embodying the present invention.

Referring to the drawings (Figs. 1 to 4), the transmission casing C of the present invention is shown as circular in transverse section. The casing comprises the main or rear casing member 21 and a front or cover member 22, the parts 21 and 22 being connected in use by bolts 23 (Fig. 2), with the rear and front parts of the casing contacting at the plane 24 of Fig. 4. The rear member 21 of the casing has a circumferentially extending rib 25 (Fig. 4) having the smoothly finished radial faces 26 and 27 respectively, the circumferential face of this rib being here shown as provided with a plurality of grooves or channels, although this is not necessary. At each side of the rib 25, the casing has a smoothly cylindrical surface 20 and 20$^a$ respectively.

Each end wall of the casing is provided (Figs. 2 and 3) with circular openings 28, 29, 30 and 31 for the reception of shaft bearings, the aligned openings 28 being designed to receive the bearings for the output shaft of the transmission unit and the aligned openings 30 being designed to receive the bearings for the input shaft. The openings 29 and 31 are for the reception of bearings for intermediate shafts which carry gears forming part of the reduction transmission mechanism.

Figure 2:
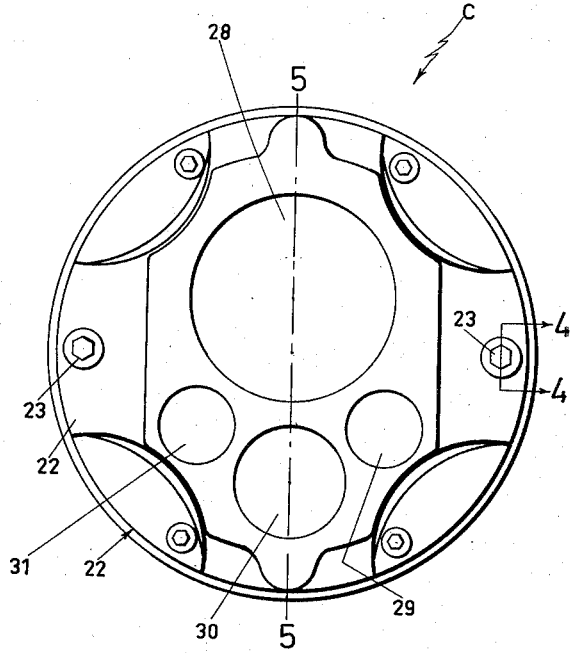
Fig. 2 is an end elevation of the front wall of the casing shown in Fig. 1.
Figure 3:
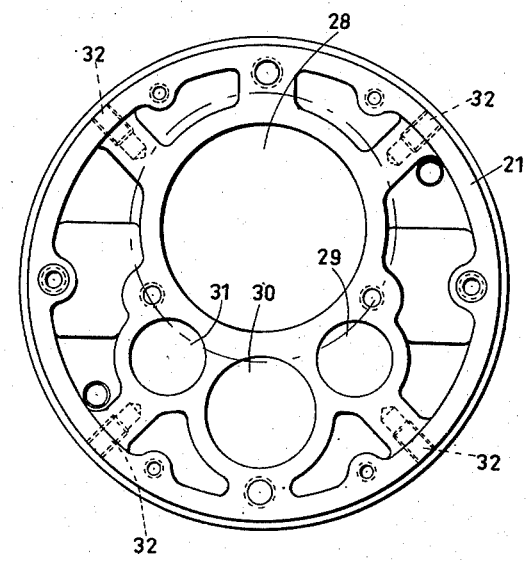
Fig. 3 is an end elevation of the main section of the casing, with the front wall removed, viewed from the right-hand side of Fig. 1.
Figure 4:
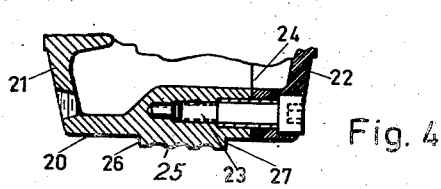
Fig. 4 is a fragmentary section substantially on the line 4—4 of Fig. 2 showing the two-part construction of the casing.
Figure 11:
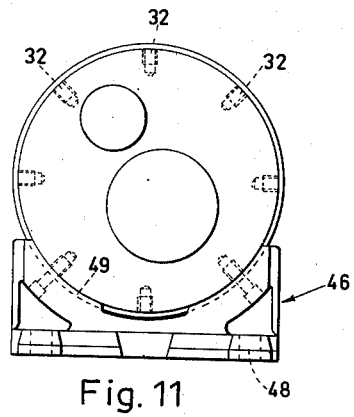
Fig. 11 is an end elevation showing the casing mounted in another type of base.
Figure 14:
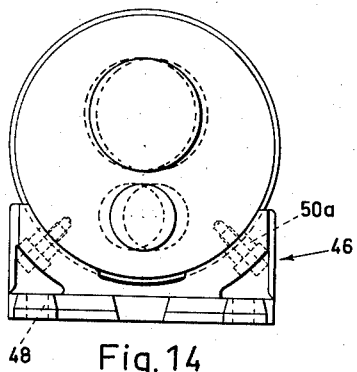
Fig. 14 is a view, generally similar to Fig. 11, illustrating another of the many possible adjustments of the casing within the base.
Figure 15:
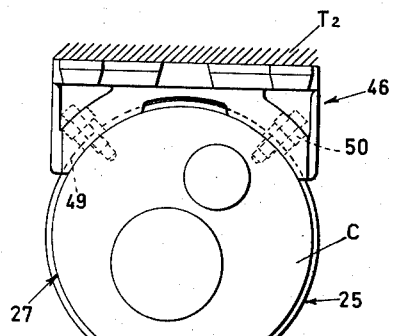
Figs. 15 and 16 are views generally similar to Fig. 11, but diagrammatically illustrating different positions in which the base may be mounted.

As illustrated in Figs. 1 and 3, the main or rear member 21 of the casing is provided with a plurality of circumferentially spaced, radial, internally screw-threaded bores 32, four such bores being illustrated in Fig. 3, although a greater number may be provided, for example, as illustrated in Fig. 11. The front member 22 of the casing is likewise provided with similar radial bores 32$^a$ (Fig. 1), these bores, in each case, being located between the corresponding end of the casing and the rib 25.

Figure 5:
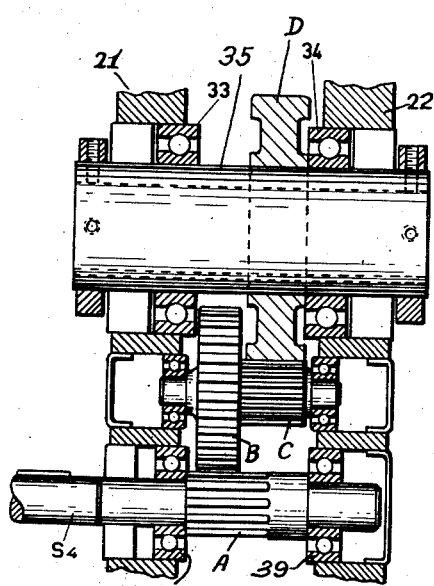
Fig. 5 is a fragmentary vertical section to larger scale than Fig. 2 and substantially in the vertical plane of the line 5—5 of the latter figure, showing motion transmitting means of one desirable type mounted within the casing.
Figure 17:
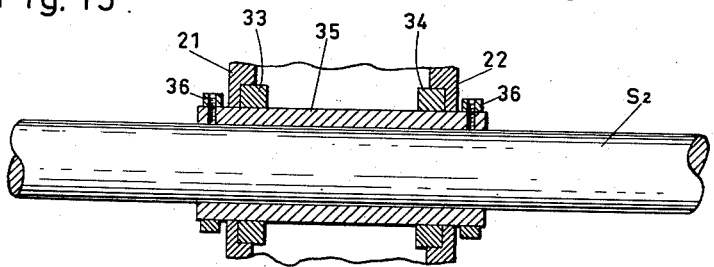
Fig. 17 is a fragmentary vertical section showing one arrangement of bearings for the output shaft.
Figure 18:
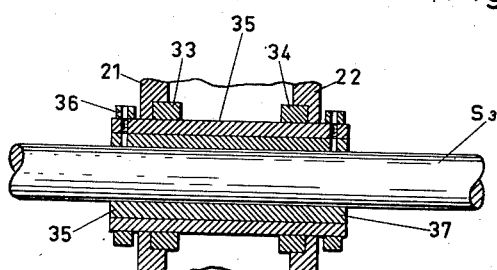
Fig. 18 is a view similar to Fig. 17, illustrating another arrangement of the output shaft bearings.

Referring to Figs. 5, 17 and 18, the casing is shown as having antifriction bearings 33 and 34 arranged within the aligned openings 28 in the parts 21 and 22 respectively. While it is possible to mount a solid output shaft in these bearings 33 and 34, it is preferred, as illustrated in Fig. 17, to mount a hollow shaft 35 to turn in the bearings 33 and 34 and then to arrange a solid output shaft S$^2$ within this hollow shaft 35. Relative rotation of the shaft S$^2$ and hollow shaft 35 is prevented by set screws 36 or otherwise. With this arrangement it is possible to use a shaft S$^2$ of any desired length, regardless of the front to rear thickness of the casing. Alternatively, if desired, the arrangement of Fig. 18 may be employed, wherein a bushing 37 is arranged within the hollow shaft 35 to accommodate a shaft S$^3$ of a smaller outside diameter than the shaft S$^2$ of Fig. 17. In either of the above arrangements, wherein the shaft 35 is hollow, it is readily possible to suspend the casing C on the shaft S$^2$ or S$^3$ which may, for example, be the shaft of a machine which is to be driven by means of the power transmission unit of the present invention. With such an arrangement rotation or oscillation of the casing may be prevented in any desired manner, for example, by the employment of a tie rod such as is well known in the art, or by fixed stop or abutment elements properly positioned with respect to the periphery of the casing.

As illustrated in Fig. 5, bearings 38 and 39 are arranged within the aligned openings 30 in the parts 21 and 22 respectively of the casing, and these bearings receive the input shaft $S^4$ to which power is applied in any desired manner, for example (Fig. 8), by means of a belt B which embraces a pulley P mounted on the outboard end of the input shaft $S^4$.

One possible gear train is diagrammatically illustrated in Fig. 5a. As there shown, the pinion A is that which is fixed to the input shaft $S^4$. This pinion meshes with each of two larger intermediate gears B and B', of the same diameter, carried by parallel shafts which turn in bearings mounted in the openings 29 and 31 respectively, of the casing. Fixed to each of the gears B and B' is a pinion C and C' respectively, of the same diameter, smaller than the gears B and B'. Each of the pinions C and C', which turn in the same direction, meshes with a gear D fixed to the shaft 35 and which is of larger diameter than the pinions C and C'. In this arrangement, the axes of the four parallel shafts are at the corners of a quadrilateral which is symmetrical with reference to a line joining the center of the input shaft $S^4$ with the center of the output shaft 35, and by the use of two intermediate shafts, each with its combined gear and pinion, a smooth action is assured and the tooth pressures and consequent wear are greatly reduced as compared with customary prior practice, thus permitting the unit to be used for transmitting heavy loads.

While, as above described, the power transmission unit comprising the casing C and its enclosed mechanism may be suspended from a shaft such as the shaft $S^3$ or $S^4$ (forming an element of the machine which is to be driven), it is contemplated that for many uses it may be desirable to mount the casing in a fixed base or support. One such base or support is illustrated in Figs. 6 and 7 respectively. This base or support 40 comprises a hollow cylindrical portion 41 which is of an internal diameter such as to receive one of the cylindrical portions 20 or 20a of the casing C. This cylindrical member 41 is provided with a plurality of circumferentially spaced slots 42, preferably elongate circumferentially of the member 41, for the reception of bolts which enter the radial bores 32 or 32a of the casing C, and which thus securely mount the casing within the base structure. Since there are a plurality of the radial bores 32 or 32a and likewise a plurality of the slots 42, it is possible, by this arrangement, to orient the casing with respect to the part 41 of the base member so that a plane extending through the axes of the openings 28 and 30 of the casing may be disposed at various angles to the horizontal. By increasing the number of the radial bores 32 as illustrated, for example, in Fig. 11, a still greater number of positions of the casing within the base is provided for. Some of these possible positions are illustrated by way of example, in Figs. 6 and 10.

The base 40 also comprises the radial attaching flange 43, Figs. 6 and 7, having therein, as shown, in Fig. 6 a plurality of elongate slots 44, 44a, 44b, etc., preferably concentric with the axis of the base and which are designed to receive bolts or lag screws 45, Fig. 8, for securing the base to a suitable support such as the vertical wall T, Fig. 7. When the base is thus mounted and the casing is installed within the base, the axis of the input and output shafts are perpendicular to the face of the wall T. While in Fig. 7 the supporting surface of the part T is indicated as vertical, it is obvious that the base 40 may be likewise secured to a supporting surface lying in any plane whether horizontal, vertical or inclined, and that according to the location of such surface the casing may project outwardly, upwardly or downwardly from the base. Not only may the casing be rotated relatively to the base by reason of the slots 42 in the part 41, but the entire base may be adjusted more or less with reference to the axis of the casing by reason of the elongate slots 44, 44a and 44b. It will be noted that in mounting the casing in the base just described, either cylindrical end portion 20 or 20a of the casing may be fitted within the cylindrical part 41 of the base, and that when so fitted into the part 41 the corresponding radial surface 26 or 27 of the casing will engage the outer edge of the part 41, thus definitely limiting the distance to which the casing may be inserted within the part 41.

In Fig. 8 the casing C is shown as mounted in a base 40 such as that illustrated in Figs. 6 and 7, having the cylindrical portion 41 and the attaching flange portion 43, the latter being provided with the slots 44, 44a and 44b. As shown in Fig. 8, the slots 44a and 44b are arcuate, their center of curvature being at the axis of the opening 28 which receives the bearings for the output shaft. In this view there is diagrammatically indicated a drive motor M which actuates the belt or chain B which embraces the pulley P on the input shaft. With this arrangement, by loosening the bolts 45 which secure the base flange 43 to the support, it is possible to turn the base slightly about the axis of the output shaft and thus vary the tension of the belt B. Alternatively, as suggested in Fig. 9, the bolts 45 may be left loose and coil springs $G^1$, $G^2$ may be arranged at one or both sides of each bolt, each spring bearing at one end against a bolt and at the other against the adjacent end of the elongate slot 44, as the case may be, the springs thus arranged being operative to hold the base flange 43 in such operative position as to keep the belt B under the desired tension. Obviously, an adjustable abutment may be provided for the outer end of one or the other of the springs G so as to vary the tension of the spring. Other and equivalent means may be provided for maintaining a desired tension in the belt B.

Figure 16:
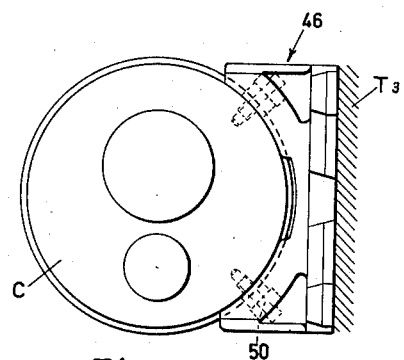

While a base, such as the base 40, is desirable for certain purposes, the present invention contemplates that the casing C may be mounted in a base of different type such, for example, as that illustrated in Figs. 11 to 16. This base 46 may conveniently be a casting comprising a bottom or attaching flange 47, having therein holes 48 for the reception of bolts by means of which the base may be secured to a support, for example a floor T' (Fig. 13); a ceiling $T^2$ (Fig. 15); or a vertical wall $T^3$ (Fig. 16). This base 46 comprises an upright portion 47a (Figs. 12 and 13) rising from the flange 47 and which has a downwardly concave arcuate surface 46a of the same radius of curvature as the cylindrical surface 20 or 20a of the casing C. The arcuate surface 46a has a groove 49 therein of a width to receive the rib 25 of the casing. The casing may thus be set down into the base with its cylindrical surfaces 20 and 20a engaging the curved surface 48 at opposite sides of the groove 49 and with the rib 25 disposed within this groove. The base is provided with a plurality of bores 50 which are radial with respect to the center of curvature of the surface 46a and which are designed to receive bolts which enter the radial bores 32 or 32a of the casing, thus securely anchoring the casing to the base. Because of the circumferential spacing of the radial bores 32 and 32a of the casing C, it is possible to mount the casing in a plurality of positions within the base 46, for example, so that the axis of the input shaft $S^4$ is above that of the output shaft $S^2$ or vice versa, or so that the axes of these two shafts lie in a horizontal plane. If, as shown in Fig. 11, for example, the casing has more than four of the radial bores 32 and 32a, the number of positions of the casing within the base may be correspondingly increased. Moreover, by making the bores 50 in the base circumferentially elongate with respect to the axis of the curved surface 48, it becomes possible rotatably to adjust the casing C relatively to the base by very small amounts. Such an arrangement, wherein the bores 50 are thus circumferentially elongate, as illustrated at 50ᵃ in Fig. 14 and the possibility of such minor adjustment of the plane of the axes of the input and output shafts is indicated in broken lines in this view.

While certain desirable embodiments of the invention have herein been illustrated and described by way of example, it is to be understood that the invention is broadly inclusive of any and all modifications falling within the scope of the appended claims, it being evident from the above description that the casing which houses the transmission mechanism is readily adaptable to be supported in an almost innumerable number of positions, such that the axes of the input and output shafts may be accommodated to almost any situation wherein powers to be transmitted from a source to a driven shaft through speed changing mechanism.

I claim:

1. In combination with a supporting base, a reduction gearing comprising parallel input and output shafts and means, including two intermediate shafts, for transmitting motion from the input shaft to the output shaft, and a casing for housing said motion transmitting means, said casing being circular in any plane perpendicular to the axis of the output shaft and comprising a body portion and a cover and means detachably uniting the cover to the body portion, the body having a circumferential rib constituting a stop to limit axial movement of the casing relatively to the base when the base and case are assembled, the cover and body portion having end walls provided with aligned openings for the reception of shaft bearings, there being four such openings in the body portion and cover respectively, of the casing, the axes of the four openings being at the corners of a quadrilateral which is symmetrical with respect to a line joining the centers of the input and output shafts.

2. A reduction gear unit capable of being supported by a driven shaft, said unit comprising a hollow casing which is circular in any plane perpendicular to the axis of the driven shaft, said casing having bearings for the driven shaft, bearings for an input shaft parallel to the driven shaft, and bearings for two intermediate shafts also parallel to the driven shaft, the axes of the driven and input shafts being on a diameter of the casing and at opposite sides of the center of the latter and the axes of the two intermediate shafts being symmetrically located at opposite sides of said diameter and in a plane perpendicular to said diameter, the input shaft having a pinion fixed thereto which meshes with two gears of equal diameter, one of which is mounted on each of the intermediate shafts respectively, a pinion coaxial with and fixed relatively to each of said gears, said pinions being of equal diameter, and a gear on the output shaft which meshes with both of said last-named pinions.

3. A reduction gearing comprising parallel input and output shafts and means for transmitting motion from one to the other, and a circular casing for housing said motion transmitting means, said casing comprising a body portion and a cover and means for detachably uniting the cover to the body portion, a base for supporting the casing, the base having a cavity therein and the casing comprising a part which is of a size and contour to fit snugly within said cavity when the casing and base are assembled, the casing also comprising a part having a surface which is so located, when the casing and base are assembled, as to contact a complemental surface of the base thereby to limit motion of the casing relatively to the base in assembling said parts, the body portion and cover each having a plurality of circumferentially spaced, radial, screw-threaded bores for the reception of bolts whereby the casing may be secured to the base.

4. A reduction gearing comprising parallel input and output shafts and means for transmitting motion from one to the other, and a casing for housing said motion transmitting means, said casing having bearings for said shafts and being of circular external contour in a plane perpendicular to the axes of said shafts, said casing comprising separable parts each having an end wall provided with openings for the shaft bearings, each of said casing parts comprising a portion having a cylindrical outer surface, said cylindrical surfaces being of the same diameter, the casing having a peripheral rib midway between its end walls, said rib having smoothly finished radial faces spaced equally from opposite ends of the casing.

5. A reduction gearing according to claim 4, wherein one of said casing parts constitutes the main or body portion of the casing and the other casing part constitutes, in effect, a cover, and means for uniting the cover to the body portion of the casing, each of said casing parts having a plurality of radial screw-threaded bores located between the adjacent end of the casing and said peripheral rib.

6. A reduction gear unit having a casing which is circular in external contour and which is provided with bearings for a plurality of parallel shafts, one of which is an input shaft and another of which is an output shaft, the axes of said shafts being eccentric with respect to the center of the casing and being parallel to the axis of the casing, a base for the casing having an arcuate surface for contact with the curved outer surface of the casing, the casing having radial bores for the reception of bolts, and the base having openings through which bolts may be entered into said bores, and means for attaching the base to a support, wherein the bolt-receiving openings in the base are elongate whereby the casing may be adjustably secured to the base.

7. A reduction gear unit having a casing provided with bearings for a plurality of parallel shafts, one of which is an input shaft and another of which is an output shaft, said casing being circular in external contour in a plane perpendicular to said shafts, a base having a hollow cylindrical socket portion designed to receive one end of the casing, the casing having a plurality of circumferentially spaced, radial, screw threaded bores and the cylindrical portion of the base having circumferentially elongate slots for the reception of bolts for securing the casing to the base, the base also comprising a radial flange having openings for the reception of fasteners for attaching the base to the support.

8. A reduction unit according to claim 7, wherein the openings in said flange for the reception of the fasteners are arcuate slots thereby permitting adjustment of the base.

9. A reduction gear unit according to claim 7, wherein the openings in the flange for the reception of the fasteners are arcuate slots coaxial with the bearing for the output shaft, thereby permitting the base to be swung about the axis of the output shaft.

10. A reduction gear unit according to claim 7, wherein the openings in the flange for the reception of the fasteners are arcuate slots, and wherein a spring is interposed between one end of each slot and the fastener element, the springs tending to rotate the base relatively to the support.

11. A reduction gear unit having a casing provided with bearings for an input shaft and an output shaft, means providing a base having a socket for the reception of one end of the casing, means for attaching the casing to the base, the base having a substantially flat surface for contact with a support, and means for attaching the base to a support, the parts being so constructed and arranged that the casing can be rotated within said socket thereby to orient a plane through the axes of the shafts about the axis of the socket.

References Cited in the file of this patent

UNITED STATES PATENTS

| | | |
|---|---|---|
| 1,246,930 | Jenney | Nov. 20, 1917 |
| 1,393,906 | Ramsey | Oct. 18, 1921 |
| 2,606,453 | Firth | Aug. 12, 1952 |
| 2,623,406 | Hansen | Dec. 30, 1952 |
| 2,655,818 | Bodle | Oct. 20, 1953 |
| 2,712,761 | Chung | July 12, 1955 |
| 2,736,210 | Christian | Feb. 28, 1956 |